(12) United States Patent
Wang et al.

(10) Patent No.: US 11,704,537 B2
(45) Date of Patent: Jul. 18, 2023

(54) OCTREE-BASED CONVOLUTIONAL NEURAL NETWORK

(71) Applicant: MICROSOFT TECHNOLOGY LICENSING, LLC, Redmond, WA (US)

(72) Inventors: Pengshuai Wang, Redmond, WA (US); Yang Liu, Redmond, WA (US); Xin Tong, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 897 days.

(21) Appl. No.: 16/606,653

(22) PCT Filed: Apr. 20, 2018

(86) PCT No.: PCT/US2018/028458
§ 371 (c)(1),
(2) Date: Oct. 18, 2019

(87) PCT Pub. No.: WO2018/200316
PCT Pub. Date: Nov. 1, 2018

(65) Prior Publication Data
US 2020/0042863 A1 Feb. 6, 2020

(30) Foreign Application Priority Data
Apr. 28, 2017 (CN) .......................... 201710297300.4

(51) Int. Cl.
*G06N 3/04* (2023.01)
*G06F 16/901* (2019.01)
(Continued)

(52) U.S. Cl.
CPC ........... *G06N 3/04* (2013.01); *G06F 16/9027* (2019.01); *G06F 17/15* (2013.01); *G06N 3/08* (2013.01)

(58) Field of Classification Search
CPC ........ G06N 3/04; G06N 3/0454; G06N 3/063; G06N 3/08; G06F 16/9027; G06F 17/15; G06T 17/005
See application file for complete search history.

(56) References Cited

U.S. PATENT DOCUMENTS 6,903,738 B2    6/2005  Pfister et al.
8,558,834 B2 *  10/2013 Lee .......................... H04N 19/90
                                                    345/424

(Continued)

FOREIGN PATENT DOCUMENTS

AU      2018258094 B2   4/2022
CN      102214366 A    10/2011
(Continued)

OTHER PUBLICATIONS

Xiaofan Xu , "Convolutional Neural Network for 3D Object Recognition using Volumetric Representation", Aug. 4, 2016, 2016 First International Workshop on Sensing, Processing and Learning for Intelligent Machines (SPLINE),pp. 1-3.*

(Continued)

*Primary Examiner* — Omar S Ismail
(74) *Attorney, Agent, or Firm* — Barta, Jones & Foley, PLLC

(57) ABSTRACT

The implementations of the subject matter described herein relate to an octree-based convolutional neural network. In some implementations, there is provided a computer-implemented method for processing a three-dimensional shape. The method comprises obtaining an octree for representing the three-dimensional shape. Nodes of the octree include empty nodes and non-empty nodes. The empty nodes exclude the three-dimensional shape and are leaf nodes of the octree, and the non-empty nodes include at least a part of the three-dimensional shape. The method further comprises for nodes in the octree with a depth associated with a (Continued)

convolutional layer of a convolutional neural network, performing a convolutional operation of the convolutional layer to obtain an output of the convolutional layer.

20 Claims, 5 Drawing Sheets

(51) Int. Cl.
    *G06F 17/15*     (2006.01)
    *G06N 3/08*     (2023.01)

(56) References Cited

U.S. PATENT DOCUMENTS

| | | | |
|---|---|---|---|
| 9,495,764 | B1 | 11/2016 | Boardman et al. |
| 2003/0214502 | A1* | 11/2003 | Park .................. G06T 15/405 345/419 |
| 2006/0017720 | A1 | 1/2006 | Li |
| 2006/0143202 | A1* | 6/2006 | Parker .................. G06F 30/00 |
| 2006/0221075 | A1 | 10/2006 | Hashima et al. |
| 2010/0082703 | A1 | 4/2010 | Zhou et al. |
| 2013/0235050 | A1* | 9/2013 | Karras .................. G06T 17/005 345/505 |
| 2015/0006117 | A1* | 1/2015 | Zhang .................. G06V 20/64 703/2 |
| 2016/0335795 | A1 | 11/2016 | Flynn et al. |
| 2016/0379109 | A1 | 12/2016 | Chung |
| 2017/0039759 | A1* | 2/2017 | Huet .................. B33Y 50/02 |
| 2017/0046616 | A1 | 2/2017 | Socher et al. |
| 2017/0109611 | A1* | 4/2017 | Luo .................. G06V 20/64 |
| 2018/0075622 | A1* | 3/2018 | Tuffreau .................. G06T 9/40 |
| 2021/0159912 | A1 | 5/2021 | Wang et al. |

FOREIGN PATENT DOCUMENTS

| | | | |
|---|---|---|---|
| CN | 102999937 | A | 3/2013 |
| CN | 104616345 | A | 5/2015 |
| CN | 106095907 | A | 11/2016 |
| CN | 109410321 | A | 3/2019 |
| CN | 112991424 | A | 6/2021 |
| EP | 2933777 | A1 * | 10/2015 .......... B29C 64/386 |
| EP | 2933777 | A1 | 10/2015 |
| EP | 3007136 | A1 | 4/2016 |
| EP | 3121789 | A1 | 1/2017 |
| GB | 2389500 | A | 12/2003 |
| JP | 2006277562 | A | 10/2006 |
| JP | 2013069132 | A | 4/2013 |
| RU | 2339083 | C2 | 11/2008 |

OTHER PUBLICATIONS

Kun Zhou, "Data-Parallel Octrees for Surface Reconstruction", May 19, 2010. IEEE Transactions on Visualization and Computer Graphics, vol. 17, No. 5, May 2011 ,pp. 669-677.*
Wang, et al., "O-CNN: Octree-based Convolutional Neural Networks for 3D Shape Analysis", In Journal of ACM Transactions on Graphics (TOG) vol. 36, Issue 4, Jul. 2017, 11 Pages.*
Long, et al., "Fully Convolutional Networks for Semantic Segmentation", In Proceedings of the IEEE Conference on Computer Vision and Pattern Recognition, Jun. 7, 2015, pp. 3431-3440.*
Xu, et al., "Convolutional Neural Network for 3D Object Recognition using Volumetric Representation", In Proceedings of First International Workshop on Sensing, Processing and Learning for Intelligent Machines, Jul. 6, 2016, 5 Pages.*
Wu, et al., "3D ShapeNets: A deep Representation for Volumetric Shapes", In Proceedings of IEEE Conference on Computer Vision and Pattern Recognition, Jun. 7, 2015, 9 Pages.*
Tatarchenko, et al., "Octree Generating Networks: Efficient Convolutional Architectures for High-resolution 3D Outputs", In Journal of Computing Research Repository, Mar. 2017, 14 Pages.*

Wilhelms, et al., "Octrees for Faster Isosurface Generation", In Journal of ACM Transactions on Graphics, vol. 11, Issue 3, Jul. 1992, pp. 201-227.*
Su, et al., "Multi-view Convolutional Neural Networks for 3D Shape Recognition", In Proceedings of the IEEE International Conference on Computer Vision, Dec. 7, 2015, pp. 1-9.*
Sedaghat, et al., "Orientation-boosted Voxel Nets for 3D Object Recognition", In Journal of the Computing Research Repository, Apr. 2016, pp. 1-22.*
Qi, et al., "Volumetric and Multi-View CNNs for Object Classification on 3D Data", In Proceedings of the IEEE Conference on Computer Vision and Pattern Recognition, Jun. 27, 2016, pp. 5648-5656.*
Noh, et al., "Learning Deconvolution Network for Semantic Segmentation", In Proceedings of IEEE International Conference on Computer Vision, Dec. 7, 2015, pp. 1520-1528.*
Maturana, et al., "VoxNet: A 3D Convolutional Neural Network for Real-Time Object Recognition", In Proceedings of IEEE International Conference on Intelligent Robots and Systems, Oct. 2, 2015, pp. 922-928.*
Ioffe, et al., "Batch Normalization: Accelerating Deep Network Training by Reducing Internal Covariate Shift", In Proceedings of the 32nd International Conference on Machine Learning, Jul. 6, 2015, 9 Pages.*
Hegde, et al., "FusionNet: 3D Object Classification Using Multiple Data Representations", In Proceedings of Thirtieth Conference on Neural Information Processing Systems, Dec. 5, 2016, pp. 1-9.*
Gwak, Junyoung, "3D Model Classification using Convolutional Neural Network", Retrieved From: http://cs229.stanford.edu/proj2015/146_report.pdf, 2015, 5 Pages.*
Guo, et al., "3D Mesh Labeling via Deep Convolutional Neural Networks", In Journal ACM Transactions on Graphics, vol. 35, Issue 1, Dec. 29, 2015, 12 Pages.*
Boscaini, et al., "Learning Shape Correspondence with Anisotropic Convolutional Neural Networks", In Proceedings of Annual Conference on Neural Information Processing Systems, Dec. 5, 2016, pp. 1-9.*
"Search Report and Written Opinion Issued in Singapore Patent Application No. 11201909561R", dated Mar. 2, 2021, 7 Pages.
Riegler et al., "OctNet: Learning Deep 3D Representations at High Resolutions", ArXiv:1611.05009v4 (2017).
International Search Report and Written Opinion for PCT/US2018/028458, dated Jan. 7, 2019.
"Office Action Issued in European Patent Application No. 18725346.3", dated Nov. 23, 2021, 5 Pages.
"Office Action Issued in Australian Patent Application No. 2018258094", dated Feb. 18, 2022, 2 Pages.
Zhou, et al., "Data-Parallel Octrees for Surface Reconstruction", In Proceedings of IEEE Transactions on Visualization and Computer Graphics, vol. 17, Issue 5, May 2011, pp. 669-681.
Bai, et al., "GIFT: A Real-time and Scalable 3D Shape Search Engine", In Proceedings of IEEE Conference on Computer Vision and Pattern Recognition, Jun. 27, 2016, 10 Pages.
Boada, et al., "3D texture-based Hybrid Visualizations", In Journal of Computers & Graphics, vol. 27, Issue 1, Feb. 28, 2003, pp. 41-49.
Boscaini, et al., "Learning Class-Specific Descriptors for Deformable Shapes using Localized Spectral Convolutional Networks", In Journal of Computer Graphics Forum, vol. 34, Issue 5, Aug. 2015, pp. 1-11.
Boscaini, et al., "Learning Shape Correspondence with Anisotropic Convolutional Neural Networks", In Proceedings af Annual Conference on Neural Information Processing Systems, Dec. 5, 2016, pp. 1-9.
Brock, et al., "Generative and Discriminative Voxel Modeling with Convolutional Neural Networks", In Journal of the Computing Research Repository, Aug. 15, 2016, pp. 1-9.
Bronstein, et al., "Geometric Deep Learning: Going Beyond Euclidean Data", In Journal of the Computing Research Repository, Nov. 2016, pp. 1-20.
Chellapilla, et al., "High Performance Convolutional Neural Networks for Document Processing", In Proceedings of the Tenth International Workshop on Frontiers in Handwriting Recognition, Oct. 23, 2006, 7 Pages.

(56) References Cited

OTHER PUBLICATIONS

Goodfellow, et al., "Deep Learning", In Publication of MIT Press, Nov. 10, 2016, 3 Pages.
He, et al., "Deep Residual Learning for Image Recognition", In Proceedings of IEEE Conference on Computer Vision and Pattern Recognition, Jun. 27, 2016, pp. 770-778.
Jia, et al., "Caffe: Convolutional Architecture for Fast Feature Embedding", In Proceedings of the 22nd ACM International conference on Multimedia, Nov. 3, 2014, 4 Pages.
Kazhdan, et al., "Poisson Surface Reconstruction", In Proceedings of the Fourth Eurographics Symposium on Geometry Processing, Jun. 26, 2006, 10 Pages.
Kazhdan, et al., "Screened Poisson Surface Reconstruction", In Journal of ACM Transactions on Graphics vol. 32, Issue 3, Jun. 1, 2013, pp. 1-13.
Krahenbuhl, et al., "Parameter Learning and Convergent Inference for Dense Random Fields", In Proceedings of the 30th International Conference on Machine Learning, vol. 3, Jun. 16, 2013, 9 Pages.
Lecun, et al., "Gradient-based Learning Applied to Document Recognition", In Proceedings of the IEEE, vol. 86, Issue 11, Nov. 1998, pp. 1-46.
Li, et al., "FPNN: Field Probing Neural Networks for 3D Data", In Proceedings of 30th Conference on Neural Information Processing Systems, Dec. 5, 2016, pp. 1-10.
Masci, et al., "Geodesic Convolutional Neural Networks on Riemannian Manifolds", In Proceedings of IEEE International Conference on Computer Vision Workshop, Dec. 7, 2015, pp. 37-45.
Meagher, Donald, "Geometric Modeling Using Octree Encoding", In Journal of Computer Graphics and Image Processing, vol. 19, Jun. 1982, pp. 129-147.
Ortiz, Cristina Gallego., "Automatic 3D Segmentation of the Breast in MRI", In Master's Thesis for the degree of Master of Science, Graduate Department of Medical Biophysics of University of Toronto, 2011, 88 Pages.
Zeiler, et al., "Visualizing and Understanding Convolutional Networks", In Proceedings of European Conference on Computer Vision, Sep. 6, 2014, pp. 818-833.
Pendleton, et al., "Perception, Planning, Control, and Coordination for Autonomous Vehicles", In Journal of Machines, vol. 5, Issue 1, Feb. 17, 2017, pp. 1-54.
Qi, et al., "PointNet: Deep Learning on Point Sets for 3D Classification and Segmentation", In Proceedings of the IEEE Conference on Computer Vision and Pattern Recognition, Jul. 26, 2017, pp. 77-85.
Riegler, et al., "OctNetFusion: Learning Depth Fusion from Data", In repository of arXiv, arXiv:1704.01047, Apr. 4, 2017, 19 Pages.
Savva, et al., "SHREC'16 Track Large-Scale 3D Shape Retrieval from Shape Net Core55", In Proceedings of the Eurographics Workshop on 3D Object Retrieval, May 8, 2016, 11 Pages.
Shi, et al., "DeepPano: Deep Panoramic Representation for 3-D Shape Recognition", In Journal of IEEE Signal Processing Letters, vol. 22, Issue 12, Dec. 2015, pp. 2339-2343.
Sinha, et al., "Deep Learning 3D Shape Surfaces Using Geometry Images", In Proceedings of European Conference an Computer Vision, Oct. 11, 2016, pp. 223-240.
Srivastava, et al., "Dropout: A Simple Way to Prevent Neural Networks from Overfitting", In Journal of Machine Learning Research, vol. 15, Issue 1, Jun. 2014, pp. 1929-1958.
Yi, et al., "SyncSpecCNN: Synchronized Spectral CNN for 3D Shape Segmentation", In Journal of the Computing Research Repository, Dec. 2016, 11 Pages.
"Notice of Allowance Issued in Russian Patent Application No. 2019138328", dated Dec. 16, 2021, 20 Pages.
"Office Action and Search Report Issued in Chile Patent Application No. 201903013", dated Apr. 15, 2021, 10 Pages.
"Notice of Allowance Issued in Singapore Patent Application No. 11201909561R", dated Jul. 26, 2022, 5 Pages.
"Office Action Issued in Colombia Patent Application No. NC2019/0012038", dated May 25, 2022, 32 Pages.
"Office Action Issued in Japanese Patent Application No. 2019-549375", dated Jun. 20, 2022, 6 Pages.
"Octree", Retrieved from: http://web.archive.org/web/20131208032529/https://dic.academic.ru/dic.nsf/ruwiki/1322937, Dec. 8, 2013, 5 Pages.
"Office Action Issued in Russian Patent Application No. 2019138328", dated Sep. 6, 2021, 16 Pages.
"Office Action Issued in Thailand Patent Application No. 1901006728", dated Mar. 14, 2022, 4 Pages.
"Office Action and Search Report Issued in Chile Patent Application No. 201903013", dated Jul. 15, 2021, 10 Pages.
"Notice of Allowance Issued in Australian Patent Application No. 2018258094", dated Apr. 7, 2022, 3 Pages.
"Notice of Allowance Issued in Chile Patent Application No. 201903013", dated Apr. 22, 2022, 4 Pages.
"Office Action Issued in Israel Patent Application No. 270192", dated May 31, 2022, 6 Pages.
"Office Action Issued in Indian Patent Application No. 201917041244", dated Jan. 27, 2022, 6 Pages.
"Office Action Issued in Japanese Patent Application No. 2019-549375", dated Jan. 26, 2022, 8 Pages.
"First Office Action and Search Report Issued in Chinese Patent Application No. 201710297300.4", dated Jun. 3, 2021, 6 Pages.
Sealy, et al., "Smoothing of Three Dimensional Models by Convolution", In Proceedings of CG International, Jun. 24, 1996, 7 pages.
Wanyin, Xu, "Research on Fast Method for Triangular Mesh Recnostruction", A Thesis in Aerospace Manufacture Engineering, Mar. 2013, 66 Pages.
"Notice of Allowance Issued in Japanese Patent Application No. 2019-549375", dated Nov. 14, 2022, 5 Pages.
"Office Action Issued in Indonesia Patent Application No. P00201909559", dated Oct. 17, 2022, 5 Pages.
"Office Action and Search Report Issued in Colombia Patent Application No. NC2019/0012038", dated Dec. 5, 2022, 30 Pages.
"Office Action Issued in Colombian Patent Application No. NC2019/0012038", dated Aug. 30, 2022, 32 Pages.
"Notice of Allowance Issued in Indonesian Patent Application No. P00201909559", dated Mar. 6, 2023, 4 Pages.

* cited by examiner

OCTREE-BASED CONVOLUTIONAL NEURAL NETWORK

This application is a U.S. National Stage Application of PCT/US2018/028458, filed Apr. 20, 2018, which claims benefit of Chinese Patent Application No. 201710297300.4, filed Apr. 28, 2017, which applications are hereby incorporated by reference. To the extent appropriate, a claim of priority is made to each of the above disclosed applications.

BACKGROUND

In recent years, with the development of 3D capturing devices and modelling tools, the quantity and quality of 3D models and scenes increase quickly. Identifying and analyzing features of various three-dimensional shapes become more important in many shape analysis and recognition tasks, such as tasks of shape classification, shape retrieval, shape segmentation and so on.

Currently, the research community and the industry have proposed solutions for representing the three-dimensional shape and performing a convolutional neural network processing on the three-dimensional shape. However, these solutions generally require much storage space and many computing resources.

SUMMARY

In some implementations, there is provided a device which comprises a memory configured to store an octree representing a three-dimensional shape. Nodes of the octree including empty nodes and non-empty nodes. The empty nodes exclude the three-dimensional shape and are leaf nodes of the octree, and the non-empty nodes include at least a part of the three-dimensional shape. The device further includes a processing unit coupled to the memory and configured to perform acts including: obtaining the octree for representing the three-dimensional shape from the memory; and for nodes in the octree with a depth associated with a convolutional layer of a convolutional neural network, performing a convolutional operation of the convolutional layer to obtain an output of the convolutional layer.

This Summary is provided to introduce a selection of concepts that are further described below in the Detailed Description in a simplified form. This Summary is not intended to identify key features or essential features of the claimed subject matter, nor is intended to be used to limit the scope of the claimed subject matter.

DETAILED DESCRIPTION OF EMBODIMENTS

The subject matter described herein will now be discussed with reference to several example implementations. It should be understood that these implementations are discussed only for the purpose of enabling those skilled in the art to better understand and implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

In the computer vision field, the convolutional neural network has successfully demonstrated its advantage for extracting images and video data. However, it is very difficult to adapt the convolutional neural network structure and training method for a regular data structure (such as an image) to a three-dimensional shape. Different from the image and video data that are sampled on regular grids, three-dimensional shapes are represented with triangle meshes or irregularly sampled three-dimensional point clouds. However, since such representation is a non-sparse representation, it requires a large amount of storage space. Furthermore, different from the RGB data stored in a two-dimensional image, it is not clear what kind of data defined over the three-dimensional shape will be the best for the convolutional neural network.

Currently, solutions for representing the three-dimensional shapes and performing the convolutional neural network processing on the three-dimensional shapes have been proposed. However, these solutions generally require much storage space and many computing resources. To this end, it is necessary to propose a solution for a convolutional neural network used for the three-dimensional shape to at least in part solve these problems. The basic principles and several example implementations of the subject matter described herein are described with reference to the drawings in the following text.

Example Operating Environment

Figure 1:
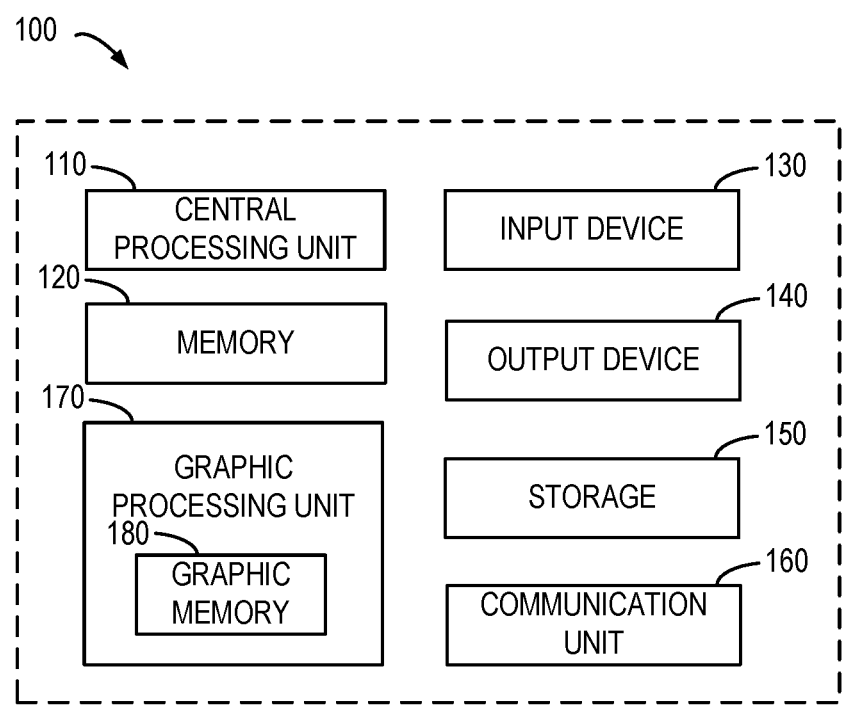
FIG. 1 schematically illustrates a block diagram of a computing environment in which a plurality of implementations of the subject matter described herein can be implemented.

Basic principles and several example implementations of the subject matter described herein will be described with reference to the drawings in the following text. FIG. 1 illustrates a block diagram of a computing system/server 100 in which one or more implementations of the subject matter described herein can be implemented. It is to be understood that the computing system/server 100 shown in FIG. 1 is only an example, rather than constituting any limit to the function and scope of the implementations of the subject matter described herein.

As shown in FIG. 1, the computing system/server 100 is in the form of a general-purpose computing device. Components of the computing system/server 100 may include, but are not limited to, one or more central processors or central processing units 100, a memory 120, one or more input devices 130, one or more output devices 140, a storage 150, and one or more communication units 160 and one or more graphic processing units 170. The processing unit 100 may be a real or a virtual processor and is capable of performing various processes in accordance with programs stored in the memory 120. In a multi-processing system, multiple processing units execute computer-executable instructions to increase processing capability.

The computing system/server 100 typically includes a plurality of computer mediums. Such medium may be any available medium accessible to the computing system/server 100, including but not limited to a volatile and non-volatile medium, and a removable and non-removable medium. The memory 120 may be a volatile memory (for example, a register, a cache, a random-access memory (RAM)), a non-volatile memory (for example, a read only memory (ROM), an electrically erasable programmable read only memory (EEPROM), a flash memory), or some combination thereof. The storage 150 may be removable or non-removable, and may include machine readable medium such as a flash driver, a magnetic disk or any other medium which can be used to store information and be accessed within the computing system/server 100.

The computing system/server 100 may further include other removable/non-removable, volatile/non-volatile computing system storage medium. Although not shown in FIG. 1, a disk driver for reading from or writing to a removable, non-volatile disk (for example, a "floppy disk"), and an optical disk driver for reading from or writing to a removable, non-volatile optical disk can be provided. The memory 120 may include at least one program product having a set of program modules (for example, at least one program module) that are configured to carry out the functions of various implementations of the subject matter described herein.

A program/utility program tool having a set of the program modules (at least one program module) may be stored in, for example, the memory 120. Such program modules include, but are not limited to, an operating system, one or more applications, other program modules, and operation data. Each or a certain combination of these examples may include an implementation of a networking environment. The program modules can carry out the functions and/or methods according to a plurality of implementations of the subject matter described herein. In some implementations, such program modules can also be stored in the storage 150.

The input unit(s) 130 may be one or more of various input devices. For example, the input unit(s) 130 may include a user device such as a mouse, keyboard, trackball, etc. The communication unit(s) 160 implements communication over a communication medium to another computing entity. Additionally, functionality of the components of the computing system/server 100 may be implemented in a single computing machine or in multiple computing machines that are able to communicate over communication connections. Thus, the computing system/server 100 may operate in a networked environment using logical connections to one or more other servers, network personal computers (PCs), or another common network node. By way of example, and not limitation, the communication medium includes wired or wireless networking techniques.

The computing system/server 100 may also communicate, as required, with one or more external devices (not shown), such as a storage device, a display device, and the like, one or more devices that enable a user to interact with the computing system/server 100, and/or any device (for example, a network card, a modem, etc.) that enables the computing system/server 100 to communicate with one or more other computing devices. Such communication may be performed via an input/output (I/O) interface(s) (not shown).

The central processing unit 110 can communicate with the graphic processing unit 170 via an accelerating bus (not shown). The graphic processing unit 170 can transmit data to the central processing unit 110 via the bus and receive data from the central processing unit via the bus. The graphic processing unit 170 includes a graphic memory 180 for storing data associated with the convolutional neural network. As the storage space for the graphic memory 180 is limited, when the convolutional neural network is trained with the graphic processing unit 170, the storage space should be fully utilized and saved. The graphic processing unit 170 further includes a processing unit for reading data from the graphic memory 180 and/or writing data to the graphic memory 180 and processing the data. The graphic processing unit 170 and the central processing unit 110 can be integrated on a board or formed on respective boards separately.

Generally, the graphic processing unit 170 is configured to accelerate the real-time display of the three-dimensional graph. As demands on the graphic processing capability increasing, the performance of the graphic processing unit becomes more powerful and more and more programmable. At present, the graphic processing unit can perform many other tasks irrelevant to graphic processing effectively. For example, the graphic processing unit possesses powerful parallel computing capability, and thus can be utilized in the neural network model, particularly in training the neural network model. The convolutional neural network model described herein can be at least in part (or entirely) implemented on the graphic processing unit 170, so as to mitigate the computing constraint on the central processing unit 110 and make full use of the parallel processing capability of the graphic processing unit 170.

Example Architecture of the Convolutional Neural Network

Figure 2:
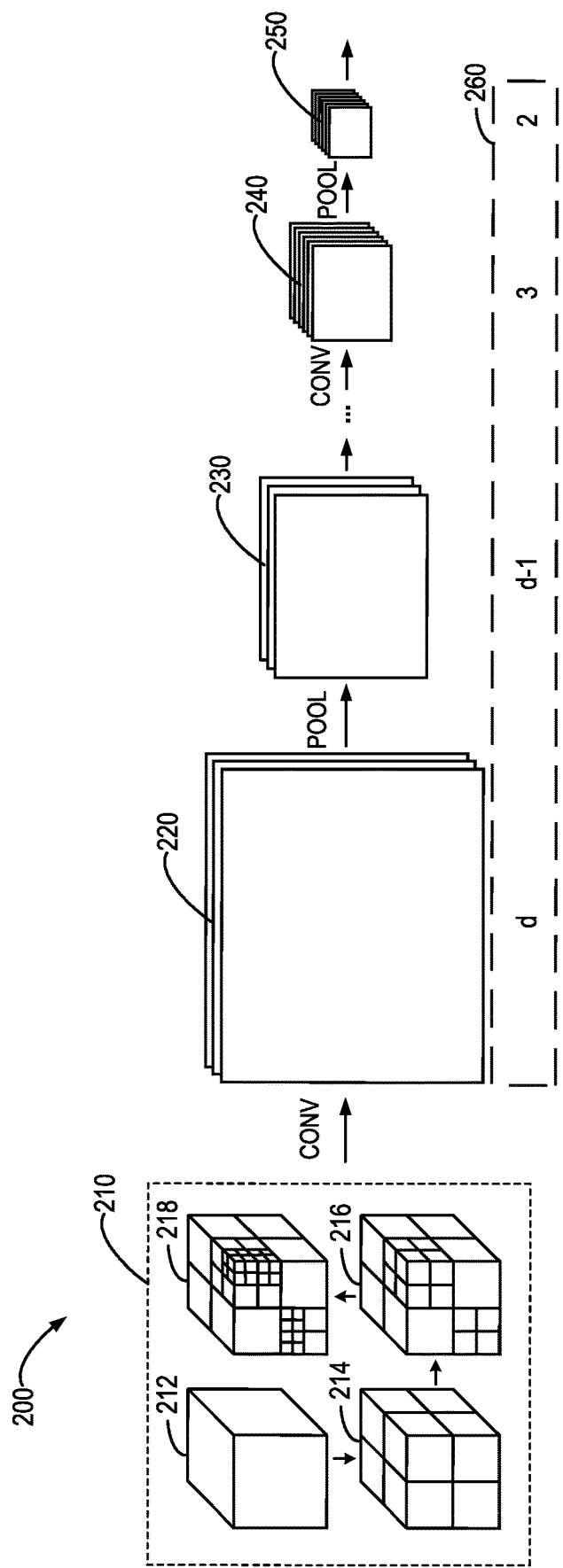
FIG. 2 illustrates a schematic diagram of a convolutional neural network according to an implementation of the subject matter described herein.

FIG. 2 illustrates an example architecture 200 of a convolutional neural network according to an implementation of the subject matter described herein. It is to be understood that the architecture 200 shown in FIG. 2 is only an example. Implementations of the subject matter described herein can also be applied to other architectures of the convolutional neural network. The subject matter described herein is not limited in this respect.

As shown in FIG. 2, an input 210 of the convolutional neural network is an octree representation in a three-dimensional shape. In some implementations, each leaf node can store the average normal of points inside the leaf node. The geometrical structure of the three-dimensional shape can be approximated by an octree with the discrete normal field. A convolutional neural network model can be constructed on the basis of an octree representation. It should be noted that the normal signal and the average normal are only examples for representing data signals in a three-dimensional shape. The subject matter described herein can also be applied to data signals in any other suitable form. The subject matter described herein is not limited in this respect.

As shown in FIG. 2, the structure of the octree is shown in the input 210. In some implementations, representations of other types in the three-dimensional shape can be converted into the octree representation and then provided as the input 210 to the convolutional neural network. For example, in a cube 212, a three-dimensional geometrical shape, such as an airplane, may be contained. The cube 212 corresponds to the root node of the octree, namely, with 0-depth. Then, the cube 212 can be divided into eight nodes, as shown by a cube 214, namely, with 1-depth. Thus, each node corresponds to a child node of the root node.

As the three-dimensional geometrical shape is not spread throughout the entire three-dimensional space, with further division of the three-dimensional space, some nodes will not include the three-dimensional shape. In this case, such empty nodes will not be divided while only non-empty nodes are further divided. Therefore, the empty nodes are also the leaf nodes of the octree. With further division of nodes containing three-dimensional shape, cubes 216 and 218, corresponding to 2-depth and 3-depth, are obtained, respectively. Further division of nodes generates the octree of d-depth. In the following text, a representation based on an octree according to some implementations of the subject matter described herein will be described in detail with reference to FIGS. 3 and 4.

After receiving the input 210 represented with the octree, convolutional neural network operations can be performed for the nodes of the octree from the bottom up. As shown in FIG. 2, the depth of the neural network is shown in a dashed box 260. In the example architecture 200, a feature map 220 is obtained by performing a convolutional operation on nodes with d-depth in the input 210. The feature map 220 illustrates three channels. However, it should also be appreciated that any other suitable number of channels can also be applied. The subject matter described herein is not limited in this respect. A feature map 230 can be obtained by performing a pooling operation on the feature map 220. Then, one or more convolutional and pooling operations are repeated successively. For example, a feature map 240 can be obtained by performing a convolutional operation on the nodes with 3-depth, and a feature map 250 can be obtained by performing a pooling operation on the feature map 240. The feature map 250 can be provided to other neural network layers (for example, a fully connected layer) for various purposes, such as classification.

Due to shape characteristics of the three-dimensional shape, the empty nodes exist in the octree as the leaf nodes, which enables many nodes to be omitted in such octree. For example, an empty node with 1-depth will cause all the nodes under this empty node to be omitted, which significantly reduces node data to be stored and operated, thereby saving the storage space and improving computational efficiency.

Data Structure

Conventional implementations of the octree structure lack an effective access to a specific node. Thus, it is improper to employ these implementations in a convolutional neural network that accesses data frequently. To further improve the access efficiency of the octree, there is provided an effective octree storage solution which supports quick access to the convolutional neural network and conventional convolutional neural network operations integrated with the octree representation.

In the architecture shown in FIG. 2, the maximum depth of the octree is represented as d. In some implementations, each node of the octree can be assigned with a key or an index according to the shuffled key method. Each node of the octree has 8 child nodes which, therefore, can be encoded with a three-bit binary code ranging from 0 to 7. In other words, the binary code can encode the sub-area covered by each child node. For example, if x bit is 1, then the child node covers nodes along the x-axis direction. Otherwise, the child node covers nodes in a reverse direction against the x-axis direction. Furthermore, y-bit and z-bit can be set similarly.

At the l layer of the octree, the integer coordinate (x, y, z) of the node can be represented by 3 l-bit data, namely, $x=(x_1 x_2 \ldots x_l)$, $y=(y_1 y_2 \ldots y_l)$, $z=(z_1 z_2 \ldots z_l)$, $x_l, y_l, z_l \in \{0, 1\}$. A shuffled key of the node O, key (O), is defined as:

$$\text{key}(O):=x_1 y_1 z_1 x_2 y_2 z_2 \ldots x_l y_l z_l \quad (1)$$

where l represents the depth of the node O in the octree. Therefore, the shuffled key of the node at l-depth is 3l-bit.

Each node of the octree can be represented by the shuffled key. In some implementations, all the shuffled keys at l-depth can be sorted from the smallest to the largest, and this sorted array is defined as $S_l$. It should be noted that this sorting approach is only an example and any other suitable sorting approach is also possible. The subject matter described herein is not limited in this respect. For example, the sorting can be from the largest to the smallest.

After the nodes are sorted based on the size of the shuffled keys, eight child nodes that belong to a same parent node are continuously arranged and so are all the child nodes belonging to a same subtree. This property is very useful for pooling operations which will be detailed in the following text.

As stated above, due to the property of the three-dimensional shape, some nodes of the octree are empty, namely, not containing any part of the three-dimensional shape. To remember the positions of the non-empty nodes in $S_l$, integer labels are assigned to these non-empty nodes. The label may start from 1 and increment when the next node is non-empty. For the empty nodes, their labels can be set to a preset value, such as 0. These labels can be organized into a vector or an array, which can be called the label vector $L_l$. When data flows from bottom up (namely, down-sampling), the label vector can be used.

In some implementations, all the $S_l$ (l=0, 1, ..., d) can be combined into a continuous array, called the key vector S. Accordingly, all the $L_l$ (l=0, 1, ..., d) can be combined into another continuous array, called the label vector L. Furthermore, the index of the first node at each depth can be stored into an array J, so that the $r^{th}$ non-empty node O at l-depth in S can be accessed immediately. Initially, the normal signals are coupled with the nodes of the octree at d-depth and stored in a continuous array $T_d$. Data in $T_l$ (l=0, 1, ..., d−1) are computed dynamically in the neural network and also combined into a continuous array, called the data vector T. For example, in the convolutional layer with a stride of 1, data after convolutional computation are stored in the nodes of a depth corresponding to the layer for subsequent processing, such as the pooling operation. It should be noted that arrays $S_l$, $L_l$ and $T_l$ have the same length and share the same index. Given a shuttled key of a node, the array $S_l$ can be searched to obtain a corresponding index, where information stored in $L_l$ and $T_l$ can be obtained directly. The four vectors (S, L, J, T) can be used to represent the data structure of the octree.

In some implementations, different three-dimensional shapes have different octree structures. To support effective training or deduction of the convolutional neural network with a batch input, the octrees of all three-dimensional shapes in a batch can be combined into a super-octree. For example, all the $S_l$, $L_l$ and $T_l$ of the octrees in a batch can be connected into vectors $S^*_l$, $L^*_l$ and $T^*_l$ of the super-octree which can organized as stated above, and thus details are omitted here. The super-octree can be used as the input of the convolutional neural network, such that data can be processed effectively without generating a temporary array.

Figure 3:
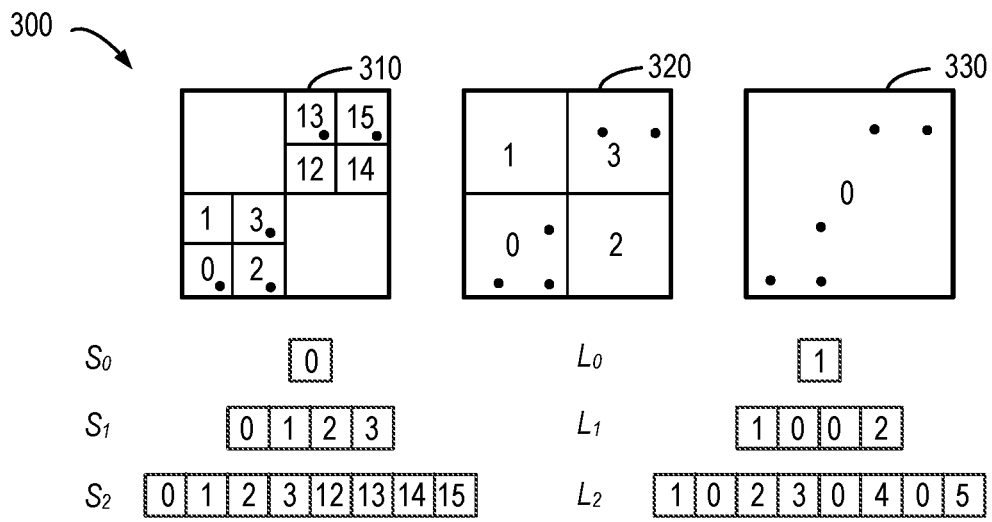
FIG. 3 schematically illustrates a quadtree for representing a convolutional neural network according to an implementation of the subject matter described herein.

Since the octree structure relates to a three-dimensional representation, it is very difficult to show the octree structure. Thus, for the sake of discussion, data structure introduced above will be described in detail with reference to quadtrees 300 and 400 in FIG. 3 and FIG. 4. It is to be understood that though it is described in detail how to determine the representation of a quadtree (or two-dimensional segmentation) with 2-depth in the following text, the following examples are only to enable those skilled in the art to understand the technical solution more clearly rather than limiting the scope of claimed subject matter. The following discussion can be easily applied to the octree structure according to the implementations of the subject matter described herein. As shown in FIG. 3, the quadtree structure 300 is a quadtree with 2-depth, where the black points represent graphical information or data, a block that does not contain a black point is an empty node and a block containing a black point is a non-empty node. The parent node is shown by the block 330 with an index of 0, represented by $S_0$. Accordingly, since this node contains graphical data, its corresponding label is assigned with a value of 1, represented by $L_0$.

At the first layer of the quadtree (1-depth), the parent node 330 is segmented into four quadrants, marked as 0, 1, 2 and 3, respectively, as shown by the block 320. In FIG. 3, the x-axis is set as the horizontal direction and y-axis is set as the vertical direction. Now, take node 2 as an example to explain how to determine indexes of nodes at the first layer. The indexes of the nodes at the first layer can be represented as $x_1y_1$. As stated above, if x-bit is 1, then the child node covers the quadrants along the positive direction of the x-axis (right side) and if y-bit is 0, then the child node covers the quadrants along the negative direction of the y-axis (lower side). Therefore, $xy=10_{(2)}=2_{(10)}$ represents the quadrant in the lower right corner. Since this quadrant does not contain graphical data, its corresponding label is assigned with a value of 0. Similarly, index 0, 1 and 3 represent quadrants at the lower left corner, the upper left corner and the right upper corner, respectively, which is shown in the block 320. Therefore, these indexes at the first layer of the quadtree can be represented by $S_l$ and their corresponding labels can be represented by $L_l$.

As can be seen from the block 320, at the first layer of the quadtree, quadrants 1 and 2 do not contain graphics and do not need to be further segmented. Conversely, both quadrants 0 and 3 contain graphics and thus can be further segmented. The block 310, namely, the layer corresponding to 2-depth of the quadtree, can be obtained after the segmentation of the block 320. The block 310 contains eight nodes, where nodes 1-3 correspond to node 0 in the block 320 and nodes 12-15 correspond to node 3 in the block 320.

Now, take node 13 as an example to explain how to determine indexes of nodes at the second layer. The indexes of the nodes at the second layer can be represented as $x_1y_1x_2y_2$, where the node 13 can be represented as $x_1y_1=11_{(2)}$, as stated above. As the node 13 covers the quadrant at the left side along the x-axis direction and at the upper side along the y-axis direction, $x_2y_2=01_{(2)}$. Therefore, the index of the node 13 is $1101_{(2)}=13_{(10)}$.

Figure 4:
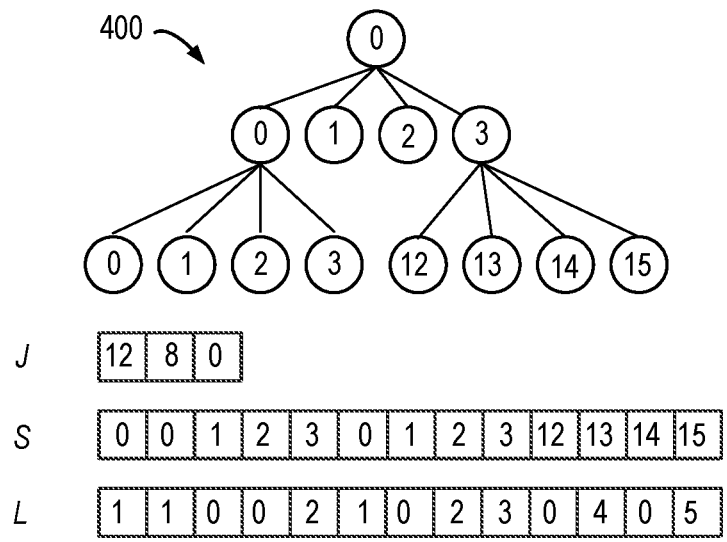
FIG. 4 schematically illustrates a quadtree for representing a convolutional neural network according to an implementation of the subject matter described herein.

FIG. 4 further illustrates the hierarchical structure 400 and the relevant data representation of the quadtree of FIG. 3. As shown in FIG. 4, the corresponding index is shown in each node. For example, as shown in the root node, its index is 0.

As illustrated above, $S_0$, $S_1$ and $S_2$ are combined into a one-dimensional vector or array S to represent the indexes of the quadtree. For example, S can be represented as "0, 1, 2, 3, 12, 13, 14, 15, 0, 1, 2, 3, 0." As shown in FIG. 4, at each layer of the quadtree, the first quadrant or node is represented by index 0 at that layer. Accordingly, $L_0$, $L_1$ and $L_2$ can also be combined into a one-dimensional vector or array L, which is represented by "1, 0, 2, 3, 0, 4, 0, 5, 1, 0, 0, 2, 1." Therefore, in the vector S, the positions of the indexes of the first nodes of the three layers of the quadtree in S are "12, 8, 0," respectively, namely, at the $13^{th}$ position, the $9^{th}$ position and the $1^{st}$ position in S, respectively. This position information is represented by J Corresponding to the index S, shape data associated with the nodes can also be stored as the vector T with the same dimension as S. For example, the shape data can be the average normal of points inside a respective node as stated above.

The above only introduces an example way of combination. It is to be understood that other ways of combination are also possible. The subject matter described herein is not limited in this respect. For example, $S_0$, $S_1$ and $S_2$ can be combined into "0, 0, 1, 2, 3, 0, 1, 2, 3, 12, 13, 14, 15." Accordingly, L and J can be combined into "1, 1, 0, 0, 2, 1, 0, 2, 3, 0, 4, 0, 5" and "0, 1, 5," respectively.

Operations of the Convolutional Neural Network

The basic operations in the convolutional neural network are convolution and pooling. For image processing, these operations should be performed for all the areas, because each pixel contains color information and the information should be propagated to other areas through these operations. However, for a three-dimensional shape, geometrical information only exists in limited areas. It is unnecessary to propagate information to empty areas, which would take up a lot of computing resources. According to some implementations of the subject matter described herein, information propagation is limited in an octree and convolutional and pooling operations are performed accordingly. In other words, convolutional neural network operations are performed where nodes of the octree exist. Furthermore, deconvolutional and unpooling operations are expanded on the octree structure.

To apply the convolutional operation to a node of the octree, it is necessary to determine neighboring nodes with the same depth. To perform the computation effectively, the convolutional operation sign can be written in the following expanded form:

$$\Phi_c(O) = \sum_n \sum_i \sum_j \sum_k W_{ijk}^{(n)} \cdot T^{(n)}(O_{ijk}) \quad (2)$$

where $O_{ijk}$ represents neighboring nodes of O, $T(\cdot)$ represents the feature vector associated on $O_{ijk}$, $T^{(n)}(\cdot)$ represents the $n^{th}$ channel of the feature vector, and $W_{ijk}^{(n)}$ is the weight of convolutional operation. If $O_{ijk}$ does not exist in the octree, $T(O_{ijk})$ is set to zero vector. In such form, the convolutional operations are converted into matrix operations, and these linear algebra operations can be effectively implemented on the graphical computing unit.

If the size of the convolution core (also called filter) of the convolutional operation is K, then the convolutional operation requires to access $K^3-1$ neighboring nodes of each octree node. To obtain the neighboring nodes, traversing the octree from top down is not a sufficiently effective option. If the stride of the convolutional operation is 1, then the convolutional operation is applied to all the nodes at the current layer of the octree. Conventionally, $K^3-1$ queries are required for each node. However, the neighbors of eight child nodes under the same parent node are highly overlapped and have only $(K+1)^3$ nodes in total (including the eight child nodes per se). Thus, the neighbor search can accelerate the process by only searching $(K+1)^3-8$ neighboring nodes of eight child nodes. For example, if K=3, this optimization can speed up the search operation by more than twice.

Figure 5:
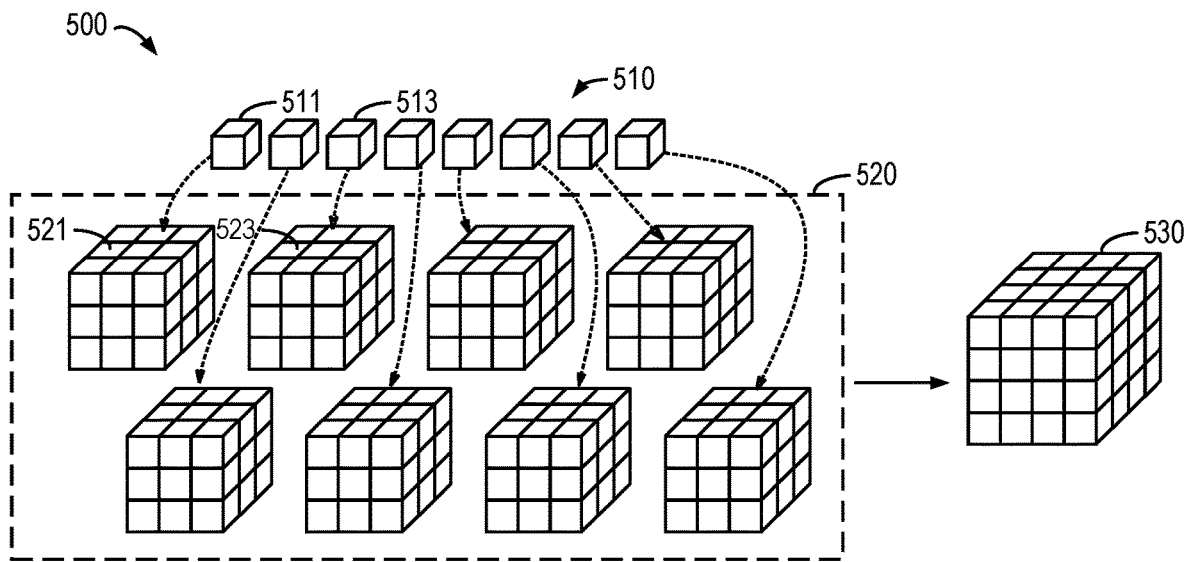
FIG. 5 illustrates a schematic diagram of a convolutional operation of a convolutional neural network according to an implementation of the subject matter described herein.

FIG. 5 illustrates an example of a convolutional operation 500 according to some implementations of the subject matter described herein. In the implementations illustrated in FIG. 5, the size of the convolution core is 3. However, it is to be understood that this is only an example. The subject matter described herein is not limited in this respect.

FIG. 5 illustrates eight child nodes 510 having a same parent node, where 27 nodes (including the child node per se) adjacent to each child node are represented by a respective cube in eight cubes 520, respectively. For example, 27 nodes adjacent to node 511 (including node 511 per se) are represented by the cube 521, and 27 nodes adjacent to node 513 (including node 513 per se) are represented by the cube 523. These cubes have a lot of overlaps, while actually only contains $(K+1)^3=64$ nodes (containing the node 510 per se), which are represented by the cube 530. According to the conventional approach of traversing the octree from top down, $8 \times K^3=216$ queries need to be implemented. In contrast, according to the method shown in FIG. 5, only 64 queries need to be performed, which significantly reduces the number of queries.

If the stride is 2, for eight child nodes under a same parent node, the convolution can be applied to the first child node while neglecting the seven other nodes, which is equivalent to down-sampling the resolution of the feature map with a factor of 2. For convolutional operations with a stride of $2^r$ (r>1), the operations can be applied to the first node of each sub-tree with a height of r. Then, the feature map performs down-sampling with a factor of $2^r$. Because of the special hierarchical structure of the octree, the stride of the convolution is constrained to an integer power of 2.

Figure 6:
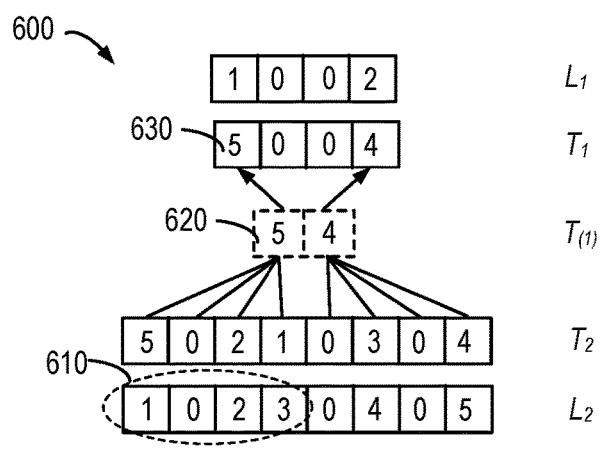
FIG. 6 illustrates a schematic diagram of down-sampling of a convolutional neural network according to an implementation of the subject matter described herein.

When convolutional operations with a stride larger than 1 is performed, down-sampling occurs and the length of the shape data array T is shortened. The data flows from bottom up in the octree and the label information stored in the $L_1$ can be used to obtain the correspondence. FIG. 6 illustrates an example 600 of such quadtree. The initial length of the array $T_2$ is 8, and turns to 2 when down-sampling is performed. However, in the case that the quadtree is with 1-depth, there are four nodes and therefore the length of the array $T_1$ should be 4. By combining information in the array $L_1$ with the down-sampled array $T_{(1)}$, the updated array $T_1$ can be obtained easily. As shown in FIG. 6, for nodes "1, 0, 2, 3" with 2-depth (shown by a dashed block 610), as the parent nodes associated with "1, 0, 2, 3" are labeled as 1 and 0 in $L_1$, the down-sampled data 620 correspond to the label 1 in $L_1$. Therefore, data 620 is used to update data 630 corresponding to the label 1 in $L_1$.

In some implementations, as shown in FIG. 2, the convolutional neural network may include one or more pooling layers whose main functionality is to reduce the spatial size of the representation progressively. The pooling layer operates independently on each channel of the feature map and reduces its spatial size accordingly. The pooling layer can have many forms, such as the maximum pooling layer or the average pooling layer.

Figure 7:
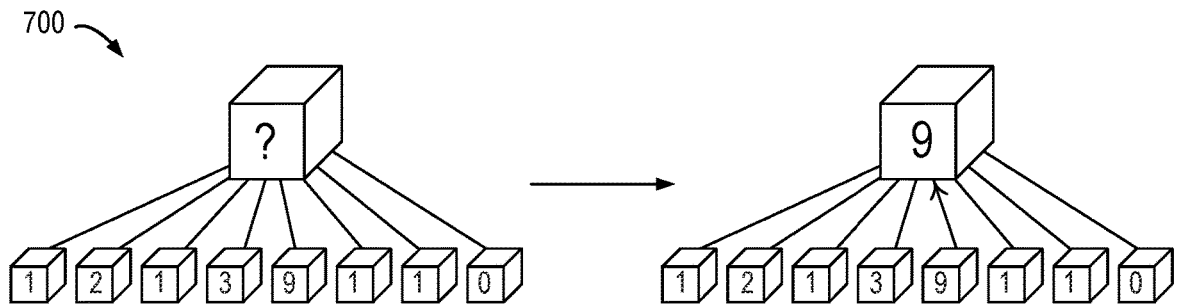
FIG. 7 illustrates a schematic diagram of a pooling operation of a convolutional neural network according to an implementation of the subject matter described herein.

FIG. 7 illustrates a schematic diagram of a pooling operation 700 according to some implementations of the subject matter described herein. The most common maximum pooling layer is to apply a filter with a size of 2 at a stride of 2. In the octree representation, the maximum pooling operation is equivalent to find the maximum data of eight nodes having a same parent node. According to some implementations of the subject matter described herein, eight nodes under a same parent node are stored continuously. Therefore, applying the maximum pooling operation on the octree reduces to selecting the maximum element from eight continuous elements of an array. As shown in FIG. 7, the maximum data of eight nodes having a same parent node is 9 and this maximum element is selected to transmit the data to the parent node. This operation can be implemented quickly on a graphic processing unit. Therefore, the resolution of a feature map will be down-sampled with a factor of 2 and information of the parent node can be used to guide further operation.

FIG. 6 also illustrates how to operate data in the case of maximum pooling. For example, for nodes "1, 0, 2, 3" with 2-depth, the corresponding data are "5, 0, 2, 1." Thus, the value obtained after performing a maximum pooling operation on these nodes is 5, as show in 620. As the parent nodes associated with "1, 0, 2, 3" are labeled as 1 and 0 in $L_1$, the down-sampled data 620 correspond to the label 1 in $L_1$, namely, data 630 can be assigned with a value of 5.

If the pooling operation relates to filters of other sizes and/or other strides, an operation similar to the above convolutional operation can be used to find the associated nodes. For example, if the maximum pooling layer applies a filter with a size of 4 at a stride of 4, it corresponds to selecting the maximum element from the elements of 64 grandchild nodes of a node.

In some implementations, the convolutional neural network can also contain an unpooling layer which is a reverse operation of the pooling layer and is an up-sampling operation. The unpooling layer can be used for visualization and image segmentation for the convolutional neural network. The unpooling operation is usually as accompanied with the pooling operation. After the maximum pooling operation is applied, the position of the maximum value within each pooling area can be recorded in a set of switch variables. The corresponding maximum unpooling operation makes use of these switch variables to place the signal in the current feature map in the appropriate position of the up-sampled feature map.

Figure 8:
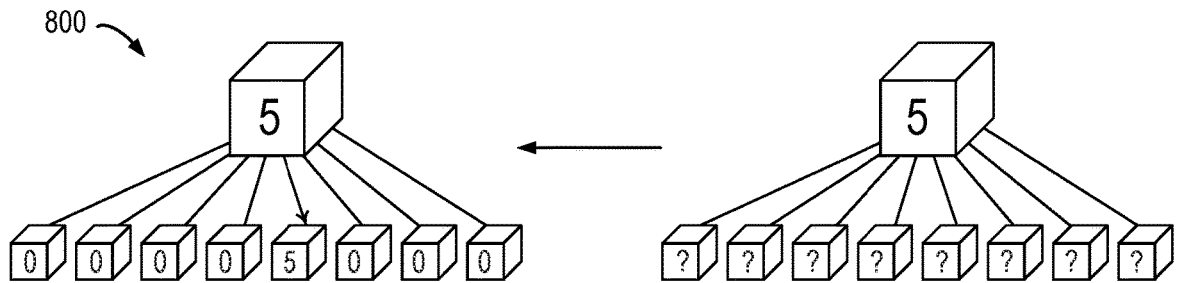
FIG. 8 illustrates a schematic diagram of an unpooling operation of a convolutional neural network according to an implementation of the subject matter described herein.

FIG. 8 illustrates a schematic diagram of an unpooling operation 800 according to some implementations of the subject matter described herein, which corresponds to the pooling operation shown in FIG. 7. In FIG. 7, after the maximum pooling operation is applied, the position of the maximum value is recorded. Therefore, in FIG. 8, when the maximum unpooling operation is applied, the signal in the current feature map (5 in this example) is placed into the appropriate position of the up-sampled feature map.

In some implementations, the convolutional neural network may further include a deconvolutional layer which is a reverse operation of the convolutional layer, namely, reversing the forward computation (forward convolutional computation) and backward computation (reversely transmitting the gradient of the convolutional computation) of the convolutional layer. The forward computation function of the deconvolutional operation directly employs the convolutional backward computation function, and the backward computation function of the deconvolutional operation directly employs the convolutional forward computation function.

It should be noted that operations of the convolutional neural network are depicted in detail in combination with the data structure described in the previous section. However, it is to be understood that these operations can also be applied to the octree represented by the input 210 shown in FIG. 2 in combination with other data structures.

Example Training Process

Figure 9:
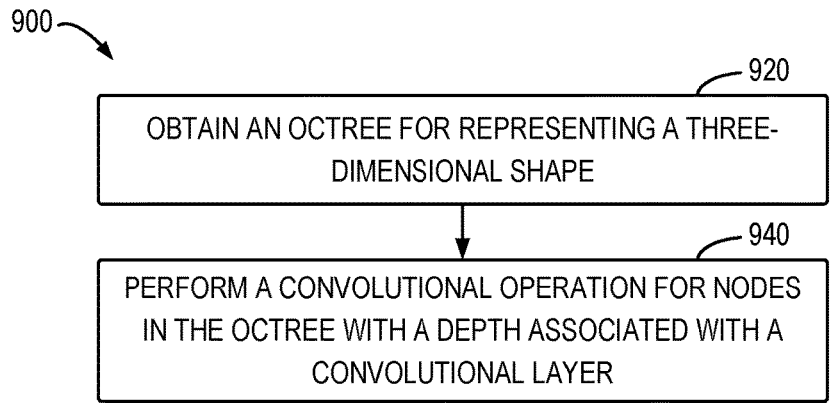
FIG. 9 illustrates a flow diagram of a method for training or applying a convolutional neural network according to an implementation of the subject matter described herein; and Throughout the drawings, the same or similar reference signs are used to indicate the same or similar elements.

FIG. 9 illustrates a flow map of a method 900 for training a convolutional neural network according to an implementation of the subject matter described herein. The method can be implemented by a graphic processing unit 170 shown in FIG. 1.

At 920, an octree for representing a three-dimensional shape is obtained. As stated above, nodes of the octree include empty nodes and non-empty nodes. The empty nodes exclude the three-dimensional shape and are leaf nodes of the octree, and the non-empty nodes include at least a part of the three-dimensional shape. In some implementations, the octree representation in three-dimensional shape can be stored in the graphic memory of the graphic processing unit 170.

In some implementations, the octree can be represented by at least one of the following: index of the nodes of the octree; label of the nodes of the octree, the label at least indicating if the nodes are empty or non-empty; shape data of the nodes of the octree, the shape data at least indicating a shape of the three-dimensional shape in the node represented by the nodes; and a hierarchical structure of the octree. In some implementations, at least one of the index, label, shape data and hierarchical structure is defined as a one-dimensional vector. For example, the index, label, shape data and hierarchical structure can be implemented by the vectors S, L, T and J discussed above.

In some implementations, the received data signals can be converted into an octree for representing a three-dimensional shape. For example, data signals representing the three-dimensional shape are received firstly, and in response to receiving the data signal, an octree for representing the three-dimensional shape is determined.

At 940, for nodes in the octree with a depth associated with a convolutional layer of a convolutional neural network, a convolutional operation of the convolutional layer is performed to obtain an output of the convolutional layer. Performing the convolutional operation can be implemented, for example, by operating the parameters of the convolutional layer and the associated data, for instance, as shown in equation (2). In some implementations, eight nodes having a same parent node can be determined from nodes with the depth associated with the convolutional layer. Next, a node neighborhood of the eight nodes is determined based on the octree. The node neighborhood includes nodes adjacent to at least one of the eight nodes. Then, the operation of the convolutional layer for the eight nodes is performed on the node neighborhood. In this way, the search operation required for the convolutional operation can be significantly simplified, which facilitates reading data from the graphic memory 180.

In some implementations, the convolutional neural network further includes a pooling layer. The method 900 further includes determining eight nodes having a same parent node from nodes with a depth associated with the pooling layer. Then, a down-sampling operation is performed on shape data of the eight nodes. The pooling layer can be the maximum pooling layer or average pooling layer.

For example, as shown in FIG. 7, in an implementation of the maximum pooling layer, eight nodes having a same parent node can be determined and the node with the maximum value of the shape data is selected.

In some implementations, the convolutional neural network further includes an unpooling layer. The method 900 further includes determining eight nodes having a same parent node from nodes with a depth associated with the unpooling layer. Then, an up-sampling operation is performed on shape data of the eight nodes. For example, the unpooling operation may be accompanied with the pooling operation. After the maximum pooling operation is applied, the position of the maximum value inside each pooling area can be recorded. The corresponding maximum unpooling operation places the signal in the current feature map in the appropriate position of the up-sampled feature map.

In some implementations, the convolutional neural network includes a deconvolutional layer. The method 900 further includes determining eight nodes having a same parent node from nodes with a depth associated with the deconvolutional layer. Then, a node neighborhood of the eight nodes are determined based on the octree. The node neighborhood include nodes adjacent to at least one of the eight nodes. Then, an operation of the deconvoluitonal layer for the eight nodes is performed on the node neighborhood.

For example, in the classification application, the result obtained with the convolutional neural network can be compared with the ground truth. Then, the gradient of the loss function is propagated reversely to update the parameters of the convolutional neural network. As the convolutional neural network needs to process a large amount of data during the training process, the method 900 is particularly useful for the training process of the convolutional neural network during which data can be trained in batch, and thus is particularly adapted for parallel processing and suitable to be implemented by the graphic processing unit. However, it should be noted that the method 900 can also be applied to the process of determination with the convolutional neural network model.

Related Applications of the Convolutional Neural Network

In recent years, the network architecture of the convolutional neural network evolves rapidly. Deeper and wider networks have shown their superiority in accomplishing many tasks. The three-dimensional convolutional neural network can enhance its capability with different network structures. To present the advantages of an octree-based representation according to some implementations of the subject matter described herein more clearly, a simple neural network is illustrated here. However, it is to be understood that the octree-based representation according to the implementations of the subject matter described herein can be applied to various convolutional neural network architectures. The subject matter described herein is not limited in this respect.

The design of the octree-based convolutional neural network includes repeatedly applying convolutional and pooling operations on an octree data structure from bottom up. Furthermore, an activation function can be utilized, for example, the output can be activated with a non-linear activation function, such as a rectified linear unit (ReLU). Furthermore, batch normalization (BN) can be used to reduce internal covariate shift. The operation sequence "convolution+BN+ReLU+pooling" is a basic unit of the convolutional neural network. If the convolution is applied to the node of l-depth, then the basic unit can be represented by $U_l$. The number of channels of the feature map for $U_l$ can be set as $2^{max(2,\ 9-l)}$, where max is the maximum value function and the convolution kernel size can be set as 3, for instance. Therefore, the convolutional neural network can be defined by the following form:

$$\text{Input} \to U_d \to U_{d-1} \to \ldots \to U_2$$

and for the sake of convenience, it is called O-CNN(d).

Since the feature map is only associated with nodes, its storage space is in linear relation with the number of nodes at the corresponding depth. Compared with the full voxel representation which occupies space of about $\mathcal{O}(n^3)$, the octree structure only takes $\mathcal{O}(n^2)$ space, where n represents the resolution number. Therefore, the octree representation according to some implementations of the subject matter described herein can reduce the storage space significantly and is very suitable for the graphic processing unit with relatively small storage space.

In some implementations, O-CNN can be applied for shape analysis, for instance, object classification, shape retrieval, shape segmentation and the like. For object segmentation, two fully connected (FC) layers, a softmax layer and two Dropout layers can be added after O-CNN(d), namely, $$O\text{-CNN}(d) \to \text{dropout} \to FC(128) \to \text{dropout} \to FC(N_C) \to \text{softmax} \to \text{output}$$

where 128 represents the number of neurons in FC and $N_C$ represents the number of classification categories. The Dropout layers are used to avoid overfitting. For shape retrieval, the output from the above object classification can be used as the key to search for the most similar shapes.

For shape segmentation, the deconvolutional network can be cascaded with O-CNN(d) to obtain the segmentation label on each leaf node. The deconvolutional network is a mirror layout of O-CNN(d), where the deconvolutional and unpooling operations replace the convolutional and pooling operations. "Unpooling+deconvolution+BN+ReLU" is defined as a basic unit and represented as $DU_l$ if unpooling is applied to nodes with l-depth. The deconvolutional network D-O-CNN(d) can take the form: $DU_2 \to DU_3 \to \ldots \to Du_{d-1}$.

Tests show that the storage efficiency and computing efficiency are significantly improved for the above three applications of the convolutional neural network. Accordingly, the depth of the octree representation can be increased substantially, thereby further improving the precision of the neural network model.

The functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chips (SOCs), Complex Programmable Logic Devices (CPLDs), and the like.

Program codes for carrying out the methods of the subject matter described herein may be written in any combination of one or more programming languages. These program codes may be provided to a processor or a controller of a general purpose computer, a special purpose computer, or other programmable data processing apparatus, such that the program codes, when executed by the processor or the controller, cause the functions/operations specified in the flowcharts and/or block diagrams to be implemented. The program codes may be executed entirely on a machine, partly on a machine, as a stand-alone software package, partly on a machine and partly on a remote computer or entirely on a remote machine or server.

In the context of the disclosure, a machine readable medium may be any tangible medium that can contain, or store a program for use by or in connection with an instruction execution system, apparatus, or device. The machine readable medium may be a machine readable signal medium or a machine readable storage medium. The machine readable medium may include but not limit to an electronic, magnetic, optical, electromagnetic, infrared, or semiconductor system, apparatus, or device, or any suitable combination thereof. More specific examples of the machine readable storage medium include an electrical connection via one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Further, although the operations are depicted in a particular order, this should not be understood as requiring such operations to be performed in the particular order shown or in sequential order. In certain circumstances, multitasking and parallel processing may be advantageous. Likewise, while several specific implementation details are contained in the above discussions, these should not be construed as limitations on the scope of the subject matter described herein. Certain features that are described in the context of separate implementations can also be implemented in combination in a single implementation. Conversely, various features that are described in the context of a single implementation can also be implemented in multiple implementations separately or in any suitable sub-combination.

Example Implementations

Some example implementations of the subject matter described herein are listed below.

According to some implementations, there is provided a device comprising: a memory configured to store an octree for representing a three-dimensional shape, nodes of the octree including empty nodes and non-empty nodes, the empty nodes excluding the three-dimensional shape and being leaf nodes of the octree, and the non-empty nodes including at least a part of the three-dimensional shape; and a processing unit coupled to the memory and configured to perform the acts, including: obtaining the octree for representing the three-dimensional shape from the memory; and for nodes in the octree with a depth associated with a convolutional layer of a convolutional neural network, performing a convolutional operation of the convolutional layer to obtain an output of the convolutional layer.

In some implementations, obtaining the octree for representing the three-dimensional shape comprises obtaining, based on a spatial segmentation for the three-dimensional shape, at least one of: an index of a node of the octree; a label of a node of the octree, the label at least indicating whether the node is an empty node or a non-empty node; shape data of a node of the octree, the shape data at least indicating a shape of the three-dimensional shape in the node; and a hierarchical structure of the octree.

In some implementations, obtaining the octree representing the three-dimensional shape comprises: receiving a data signal representing the three-dimensional shape; and in response to receiving the data signal, determining the octree for representing the three-dimensional shape.

In some implementations, performing a convolutional operation of the convolutional layer comprises: determining eight nodes having a same parent node from the nodes with the depth associated with the convolutional layer; determining a node neighborhood of the eight nodes based on the octree, the node neighborhood including nodes adjacent to at least one of the eight nodes; and performing the operation of the convolutional layer for the eight nodes on the node neighborhood.

In some implementations, the convolutional neural network includes a pooling layer and the acts further include: determining eight nodes having a same parent node from nodes with a depth associated with the pooling layer; and performing a down-sampling operation on shape data of the eight nodes.

In some implementations, the convolutional neural network includes an unpooling layer and the acts further include: determining eight nodes having a same parent node from nodes with a depth associated with the unpooling layer; and performing an up-sampling operation on shape data of the eight nodes.

In some implementations, the convolutional neural network includes a deconvolutional layer and the acts further include: determining eight nodes having a same parent node from nodes with a depth associated with the deconvolutional layer; determining a node neighborhood of the eight nodes based on the octree, the node neighborhood including nodes adjacent to at least one of the eight nodes; and performing an operation of the deconvoluitonal layer for the eight nodes on the node neighborhood.

In some implementations, at least one of the index, the label, the shape data and the hierarchical structure is defined as a continuous vector.

In some implementations, the device is a graphic processing unit (GPU).

According to some implementations, there is provided a computer-implemented method comprising: obtaining an octree for representing a three-dimensional shape, nodes of the octree including empty nodes and non-empty nodes, the empty nodes excluding the three-dimensional shape and being leaf nodes of the octree, and the non-empty nodes including at least a part of the three-dimensional shape; and for nodes in the octree with a depth associated with a convolutional layer of a convolutional neural network, performing a convolutional operation of the convolutional layer to obtain an output of the convolutional layer.

In some implementations, obtaining an octree for representing a three-dimensional shape comprises obtaining, based on a spatial segmentation for the three-dimensional shape, at least one of: an index of a node of the octree; a label of a node of the octree, the label at least indicating whether the node is an empty node or a non-empty node; shape data of a node of the octree, the shape data at least indicating a shape of the three-dimensional shape in the node; and a hierarchical structure of the octree.

In some implementations, obtaining an octree for representing a three-dimensional shape comprises: receiving a data signal representing the three-dimensional shape; and in response to receiving the data signal, determining the octree for representing the three-dimensional shape.

In some implementations, performing a convolutional operation of the convolutional layer comprises: determining eight nodes having a same parent node from the nodes with the depth associated with the convolutional layer; determining a node neighborhood of the eight nodes based on the octree, the node neighborhood including nodes adjacent to at least one of the eight nodes; and performing the operation of the convolutional layer for the eight nodes on the node neighborhood.

In some implementations, the convolutional neural network includes a pooling layer and the method further comprises: determining eight nodes having a same parent node from nodes with a depth associated with the pooling layer; and performing a down-sampling operation on shape data of the eight nodes.

In some implementations, the convolutional neural network includes an unpooling layer and the method further includes: determining eight nodes having a same parent node from nodes with a depth associated with the unpooling layer; and performing an up-sampling operation on shape data of the eight nodes.

In some implementations, the convolutional neural network includes a deconvolutional layer and the method further includes: determining eight nodes having a same parent node from nodes with a depth associated with the deconvolutional layer; determining a node neighborhood of the eight nodes based on the octree, the node neighborhood including nodes adjacent to at least one of the eight nodes; and performing an operation of the deconvoluitonal layer for the eight nodes on the node neighborhood.

In some implementations, at least one of the index, the label, the shape data and the hierarchical structure is defined as a continuous vector.

In some implementations, performing a convolutional operation of the convolutional layer comprises performing the convolutional operation of the convolutional layer at the graphic processing unit (GPU).

According to some implementations, there is provided a computer program product including instructions tangibly stored on a computer readable medium, the instructions, when executed by a machine, causing the machine to implement a method comprising: obtaining an octree for representing a three-dimensional shape, nodes of the octree including empty nodes and non-empty nodes, the empty nodes excluding the three-dimensional shape and being leaf nodes of the octree, and the non-empty nodes including at least a part of the three-dimensional shape; and for nodes in the octree with a depth associated with a convolutional layer of a convolutional neural network, performing a convolutional operation of the convolutional layer to obtain an output of the convolutional layer.

In some implementations, obtaining an octree for representing a three-dimensional shape comprises obtaining, based on a spatial segmentation for the three-dimensional shape, at least one of: an index of a node of the octree; a label of a node of the octree, the label at least indicating whether the node is an empty node or a non-empty node; shape data of a node of the octree, the shape data at least indicating a shape of the three-dimensional shape in the node; and a hierarchical structure of the octree.

In some implementations, obtaining an octree for representing a three-dimensional shape comprises: receiving a data signal representing the three-dimensional shape; and in response to receiving the data signal, determining the octree for representing the three-dimensional shape.

In some implementations, performing a convolutional operation of the convolutional layer comprises: determining eight nodes having a same parent node from the nodes with the depth associated with the convolutional layer; determining a node neighborhood of the eight nodes based on the octree, the node neighborhood including nodes adjacent to at least one of the eight nodes; and performing the operation of the convolutional layer for the eight nodes on the node neighborhood.

In some implementations, the convolutional neural network includes a pooling layer and the method further comprises: determining eight nodes having a same parent node from nodes with a depth associated with the pooling layer; and performing a down-sampling operation on shape data of the eight nodes.

In some implementations, the convolutional neural network includes an unpooling layer and the method further comprises: determining eight nodes having a same parent node from nodes with a depth associated with the unpooling layer; and performing an up-sampling operation on shape data of the eight nodes.

In some implementations, the convolutional neural network includes a deconvolutional layer and the method further includes: determining eight nodes having a same parent node from nodes with a depth associated with the deconvolutional layer; determining a node neighborhood of the eight nodes based on the octree, the node neighborhood including nodes adjacent to at least one of the eight nodes; and performing an operation of the deconvoluitonal layer for the eight nodes on the node neighborhood.

In some implementations, at least one of the index, the label, the shape data and the hierarchical structure is defined as a continuous vector.

Although the subject matter has been described with languages specific to structural characteristics and/or method logic actions, it should be appreciated that the subject matter defined by the appended claims is not limited to the above described particular characteristics and actions. Conversely, the above described particular characteristics and actions are only example forms for realizing the claims.

The invention claimed is:

1. A device comprising:
a memory configured to store an octree representing a three-dimensional shape, nodes of the octree including an empty node and a non-empty node, the empty node excluding the three-dimensional shape and being a leaf node of the octree, and the non-empty node including at least a part of the three-dimensional shape; and
a processing unit coupled to the memory and configured to perform acts including:
obtaining the octree representing the three-dimensional shape from the memory, including one or more of: an index of a node of the octree, a label of a node of the octree, shape data of a node of the octree, a hierarchical structure of the octree; and
for a node in the octree with a depth associated with a convolutional layer of a convolutional neural network, performing a convolutional operation of the convolutional layer to obtain an output of the convolutional layer.

2. The device according to claim 1, wherein
the label at least indicates whether the node is an empty node or a non-empty node,
wherein the shape data at least indicates a shape of the three-dimensional shape in the node.

3. The device according to claim 1, wherein obtaining the octree representing the three-dimensional shape comprises:
receiving a data signal representing the three-dimensional shape; and
in response to receiving the data signal, determining the octree representing the three-dimensional shape.

4. The device according to claim 1, wherein performing a convolutional operation of the convolutional layer comprises:
determining nodes having a same parent node from the node with the depth associated with the convolutional layer;
determining a node neighborhood of the determined nodes based on the octree, the node neighborhood including nodes adjacent to at least one of the determined nodes; and
performing the operation of the convolutional layer for the determined nodes on the node neighborhood.

5. The device according to claim 1, wherein the convolutional neural network includes a pooling layer, and wherein the acts further include:
determining nodes having a same parent node from a node with a depth associated with the pooling layer; and
performing a down-sampling operation on shape data of the determined nodes.

6. The device according to claim 1, wherein the convolutional neural network includes an unpooling layer and the acts further include:
determining nodes having a same parent node from a node with a depth associated with the unpooling layer; and
performing an up-sampling operation on shape data of the determined nodes.

7. The device according to claim 1, wherein the convolutional neural network includes a deconvolutional layer and the acts further include:
determining nodes having a same parent node from a node with a depth associated with the deconvolutional layer;
determining a node neighborhood of the determined nodes based on the octree, the node neighborhood including nodes adjacent to at least one of the determined nodes; and
performing an operation of the deconvolutional layer for the determined nodes on the node neighborhood.

8. The device according to claim 1, wherein one or more of the index, the label, the shape data, the hierarchical structure is defined as a continuous vector.

9. The device according to claim 1, wherein the device is a graphic processing unit (GPU).

10. A computer-implemented method comprising:
obtaining an octree representing a three-dimensional shape, nodes of the octree including an empty node and a non-empty node, the empty node excluding the three-dimensional shape and being a leaf node of the octree, and the non-empty node including at least a part of the three-dimensional shape;
for a node in the octree with a depth associated with a convolutional layer of a convolutional neural network, performing a convolutional operation of the convolutional layer to obtain an output of the convolutional layer; and
performing a down-sampling operation on shape data of a node of the octree, or an up-sampling operation on shape data of a node of the octree, or both.

11. The method according to claim 10, wherein obtaining an octree representing a three-dimensional shape comprises obtaining, based on a spatial segmentation for the three-dimensional shape, one or more of:
an index of a node of the octree;
a label of a node of the octree, the label at least indicating whether the node is an empty node or a non-empty node;
shape data of a node of the octree, the shape data at least indicating a shape of the three-dimensional shape in the node;
a hierarchical structure of the octree.

12. The method according to claim 10, wherein obtaining an octree representing a three-dimensional shape comprises:
receiving a data signal representing the three-dimensional shape; and in response to receiving the data signal, determining the octree representing the three-dimensional shape.

13. The method according to claim 10, wherein performing a convolutional operation of the convolutional layer comprises:
    determining nodes having a same parent node from the node with the depth associated with the convolutional layer;
    determining a node neighborhood of the determined nodes based on the octree, the node neighborhood including nodes adjacent to at least one of the determined nodes; and
    performing the operation of the convolutional layer for the determined nodes on the node neighborhood.

14. A computer program product including instructions tangibly stored on a computer readable medium, the instructions, when executed by a machine, causing the machine to implement a method comprising:
    obtaining an octree representing a three-dimensional shape, nodes of the octree including an empty node and a non-empty node, the empty node excluding the three-dimensional shape and being a leaf node of the octree, and the non-empty node including at least a part of the three-dimensional shape;
    for a node in the octree with a depth associated with a convolutional layer of a convolutional neural network, performing a convolutional operation of the convolutional layer to obtain an output of the convolutional layer; and
    performing an operation of a deconvolutional layer of the convolutional neural network on a node neighborhood of a node of the octree.

15. The computer program product according to claim 14, wherein obtaining an octree representing a three-dimensional shape comprises obtaining, based on a spatial segmentation for the three-dimensional shape, one or more of:
    an index of a node of the octree;
    a label of a node of the octree, the label at least indicating whether the node is an empty node or a non-empty node;
    shape data of a node of the octree, the shape data at least indicating a shape of the three-dimensional shape in the node;
    a hierarchical structure of the octree.

16. The method according to claim 10, wherein the convolutional neural network includes a deconvolutional layer and the method further includes:
    determining nodes having a same parent node from a node with a depth associated with the deconvolutional layer;
    determining a node neighborhood of the determined nodes based on the octree, the node neighborhood including nodes adjacent to at least one of the determined nodes; and
    performing an operation of the deconvolutional layer for the determined nodes on the node neighborhood.

17. The computer program product according to claim 14, wherein obtaining the octree representing the three-dimensional shape comprises:
    receiving a data signal representing the three-dimensional shape; and
    in response to receiving the data signal, determining the octree representing the three-dimensional shape.

18. The computer program product according to claim 14, wherein performing a convolutional operation of the convolutional layer comprises:
    determining nodes having a same parent node from the node with the depth associated with the convolutional layer;
    determining a node neighborhood of the determined nodes based on the octree, the node neighborhood including nodes adjacent to at least one of the determined nodes; and
    performing the operation of the convolutional layer for the determined nodes on the node neighborhood.

19. The computer program product according to claim 14, wherein the convolutional neural network includes a pooling layer, and wherein the method further includes:
    determining nodes having a same parent node from a node with a depth associated with the pooling layer; and
    performing a down-sampling operation on shape data of the determined nodes.

20. The computer program product according to claim 14, wherein the convolutional neural network includes an unpooling layer and the method further includes:
    determining nodes having a same parent node from a node with a depth associated with the unpooling layer; and
    performing an up-sampling operation on shape data of the determined nodes.

* * * * *